(12) United States Patent
Holmgren et al.

(10) Patent No.: US 7,686,460 B2
(45) Date of Patent: Mar. 30, 2010

(54) METHOD AND APPARATUS FOR INHIBITING A SUBJECT'S EYES FROM BEING EXPOSED TO PROJECTED LIGHT

(75) Inventors: David E. Holmgren, Calgary (CA); Erik Benner, Cochrane (CA)

(73) Assignee: SMART Technologies ULC (CA)

( * ) Notice: Subject to any disclaimer, the term of this patent is extended or adjusted under 35 U.S.C. 154(b) by 17 days.

(21) Appl. No.: 11/773,319

(22) Filed: Jul. 3, 2007

(65) Prior Publication Data

US 2008/0106706 A1 May 8, 2008

Related U.S. Application Data

(63) Continuation-in-part of application No. 11/420,146, filed on May 24, 2006.

(51) Int. Cl.
*G03B 21/00* (2006.01)
(52) U.S. Cl. .................... 353/121; 353/69; 353/122
(58) Field of Classification Search ............. 353/69, 353/70, 97, 121, 122; 345/647, 619, 633, 345/634, 635
See application file for complete search history.

(56) References Cited

U.S. PATENT DOCUMENTS

| | | | |
|---|---|---|---|
| 5,383,013 A | 1/1995 | Cox | |
| 5,704,836 A * | 1/1998 | Norton et al. | 463/36 |
| 6,361,173 B1 * | 3/2002 | Vlahos et al. | 353/97 |
| 6,483,485 B1 | 11/2002 | Huang et al. | |
| 6,529,992 B1 | 3/2003 | Thamas et al. | |
| 6,542,087 B2 | 4/2003 | Lin | |
| 6,704,824 B1 | 3/2004 | Goodman | |
| 6,754,725 B1 | 6/2004 | Wright et al. | |
| 6,775,014 B2 | 8/2004 | Foote et al. | |
| 6,789,903 B2 | 9/2004 | Parker et al. | |
| 6,811,267 B1 | 11/2004 | Allen et al. | |
| 6,860,604 B1 * | 3/2005 | Vlahos | 353/28 |
| 6,898,653 B2 | 5/2005 | Su et al. | |
| 6,984,039 B2 | 1/2006 | Agostinelli | |
| 6,986,030 B2 | 1/2006 | Shmueli et al. | |
| 7,165,844 B2 | 1/2007 | Kobori et al. | |
| 7,221,437 B1 | 5/2007 | Schaefer | |

(Continued)

FOREIGN PATENT DOCUMENTS

EP    1566726    8/2005

(Continued)

OTHER PUBLICATIONS

ISR and Written Opinion for PCT/CA2007/000908 mailed Sep. 12, 2007 (10 pages).

*Primary Examiner*—Georgia Y Epps
*Assistant Examiner*—Bao-Luan Le
(74) *Attorney, Agent, or Firm*—Katten Muchin Rosenman LLP (57) ABSTRACT

A method of inhibiting a subject's eyes from being exposed to projected light when the subject is positioned in front of a background on which an image is displayed comprises capturing an image of the background including the displayed image, processing the captured image to detect the existence of the subject and to locate generally the subject and masking image data used by the projector to project the image corresponding to a region that encompasses at least the subject's eyes, the image data masking compensating for differing camera and projector viewpoints.

28 Claims, 11 Drawing Sheets

U.S. PATENT DOCUMENTS

| | | |
|---|---|---|
| 7,230,685 B2 | 6/2007 | Suzuki et al. |
| 7,325,933 B2 * | 2/2008 | Kaise et al. .................... 353/97 |
| 2002/0093666 A1 * | 7/2002 | Foote et al. ................. 356/621 |
| 2002/0097218 A1 | 7/2002 | Gutta et al. |
| 2002/0113950 A1 * | 8/2002 | Vlahos ........................ 353/97 |
| 2003/0046447 A1 | 3/2003 | Kouperchliak et al. |
| 2003/0182456 A1 | 9/2003 | Lin et al. |
| 2003/0204950 A1 | 11/2003 | Chou et al. |
| 2003/0225971 A1 | 12/2003 | Oishi et al. |
| 2004/0015965 A1 | 1/2004 | Sparks |
| 2004/0165154 A1 * | 8/2004 | Kobori et al. ................. 353/69 |
| 2004/0199909 A1 | 10/2004 | Goodman |
| 2004/0205778 A1 | 10/2004 | Wong et al. |
| 2004/0230710 A1 | 11/2004 | Goodman |
| 2005/0038934 A1 | 2/2005 | Gotze et al. |
| 2005/0097573 A1 | 5/2005 | Chrysanthakopoulos et al. |
| 2005/0117132 A1 * | 6/2005 | Agostinelli .................. 353/122 |
| 2006/0015676 A1 | 1/2006 | Oribe et al. |

FOREIGN PATENT DOCUMENTS

| | | |
|---|---|---|
| WO | WO 2004040428 | 5/2004 |

* cited by examiner

| HORIZONTAL: | | |
|---|---|---|
| d=1 ft=0.31 m | | |
| d[SB] (m) | d[CP] (m) | |
| 1.524 | 3.127 | |
| 4.267 | 10.165 | |
| | | |
| d=2 ft=0.61 m | | |
| d[SB] (m) | d[CP] (m) | |
| 1.524 | 1.172 | |
| 4.267 | 4.691 | |
| | | |

FIG. 10a

| VERTICAL: | | |
|---|---|---|
| d=1ft=0.31 m | | |
| d[SB] (m) | d[CP] (m) | |
| 1.524 | 2.345 | |
| 4.267 | 7.623 | |
| | | |
| d=2ft=0.61 m | | |
| d[SB] (m) | d[CP] (m) | |
| 1.524 | 0.879 | |
| 4.267 | 3.519 | |
| | | |

FIG. 10b

| HORIZONTAL: | | |
|---|---|---|
| d[SB] (m) | d[CP] (m) | |
| 1.524 | 1.113 | |
| 4.267 | 4.451 | |
| | | |
| VERTICAL: | | |
| d[SB] (m) | d[CP] (m) | |
| 1.524 | 0.835 | |
| 4.267 | 3.343 | |
| | | |

METHOD AND APPARATUS FOR INHIBITING A SUBJECT'S EYES FROM BEING EXPOSED TO PROJECTED LIGHT

CROSS-REFERENCE TO RELATED APPLICATION

This application is a continuation-in-part of U.S. patent application Ser. No. 11/420,146 to Morrison et al. filed on May 24, 2006, the content of which is incorporated herein by reference.

FIELD OF THE INVENTION

The present invention relates generally to projection systems and in particular to a method and apparatus for inhibiting a subject's eyes from being exposed to projected light when the subject is positioned in front of a background on which a projected image is displayed.

BACKGROUND OF THE INVENTION

During presentations, use of a projector to project an image onto a projection screen so that the image can be seen by attendees is common. In many instances, presenters interact with the displayed images using a pointer to highlight and emphasize displayed information. During such interactions, presenters must often move between the projector and the projection screen and into the projected image. If the presenter moves into such a position and turns to face the audience, the projected light can be blinding. Subjecting a presenter's eyes to light of this nature is of course undesired.

Techniques to avoid exposing a presenter's eyes to projected light have been considered. For example, U.S. Pat. No. 6,361,173 to Vlahos et al. discloses a method and apparatus for inhibiting projection of selected areas of a projected image. The apparatus includes a video projector for projecting a desired video image onto a projection screen. An infrared source close to the video projector uniformly floods the projection screen with non-visible infrared radiation. An infrared sensitive camera, close to the video projector, observes the projection screen and sees only the uniform infrared illumination flooding the projection screen. Upon entry of a subject into the projected video image, the infrared radiation reflected from the subject will not match that of the projection screen and thus, the subject area can be identified. All pixels of the projected video image, in the area occupied by the subject, are inhibited before reaching the video projector. This allows the subject to look directly at an audience without being blinded by light projected by the video projector.

U.S. Pat. No. 6,860,604 to Vlahos discloses a method and apparatus for inhibiting the projection of a shadow of a presenter onto a projection screen. Left and right rectilinear corrections of an image are simultaneously projected onto the projection screen from each of two positions that are off-axis on opposite sides of the centerline of the projection screen such that both projections register as a single image. A center of mass of the presenter's silhouette is generated. A vertical join line is located on the projection screen directly behind the presenter's center of mass. The portion of the projected image from the left projector that extends to the right of the join line is inhibited. The portion of the projected image from the right projector that extends to the left of the join line is also inhibited thereby providing the full projected image on the projection screen from the left and right image segments, without either segment projecting the image onto the presenter and without casting the presenter's shadow onto the projection screen.

U.S. Pat. No. 6,945,653 to Kobori et al. discloses an anti-glare device for a projector designed to minimize stimulus to the eyes of a presenter. A displayed image captured by a camera is compared with an input image signal to generate a difference image and thus, detect the location of the presenter. The input image signal is then masked so that pixels corresponding to the area at which the presenter is located are set to black. The resulting projected image signal is then projected onto the projection screen.

Although the above-references disclose techniques to inhibit projected light from being directed into the eyes of a presenter, the systems disclosed in these references suffer disadvantages. For example, although the systems disclosed in U.S. Pat. No. 6,361,173 to Vlahos et al. and U.S. Pat. No. 6,860,604 to Vlahos avoid light projected by the projector from being directed into the eyes of a presenter, the systems still expose the presenter's eyes to infrared light. Also, each of the above-described systems determines a tight-mask defining the location of the presenter and thus, requires high-resolution cameras.

As will be appreciated, there exists a need for a projection system designed to protect a presenter's eyes from virtually any form of projected light, which is easy to manufacture and cost effective. It is therefore an object of the present invention to provide a novel method and apparatus for inhibiting a subject's eyes from being exposed to projected light when the subject is positioned in front of a background on which a projected image is displayed.

SUMMARY OF THE INVENTION

Accordingly, in one aspect there is provided in a projection system comprising a projector to project an image for display on a background and at least one camera to capture an image of said background, said at least one camera having a viewpoint differing from the viewpoint of said projector, a method of inhibiting a subject's eyes from being exposed to projected light when the subject is positioned in front of the background, said method comprising:

capturing the image of the background including the displayed image;

processing the captured image to detect the existence of a subject therein and to locate generally the subject; and masking image data used by the projector to project the image corresponding to a region that encompasses at least the subject's eyes, said image data masking compensating for said differing camera and projector viewpoints.

In one embodiment, during the processing, the subject as seen by the at least one camera is converted to a size as would be seen by the camera if positioned at the projector. The subject as seen by the at least one camera is also scaled to compensate for different camera and projector resolutions.

According to another aspect there is provided in a projection system comprising a projector to project an image for display on a background and at least two laterally spaced cameras to capture an image of said background, a method of inhibiting a subject's eyes from being exposed to projected light when the subject is positioned in front of the background, said method comprising:

successively capturing sets of images of the background including the displayed image;

processing each set of captured images to detect the existence of the subject and to locate generally the subject's head; and modifying image data used by the projector to project the image taking into account differing viewpoints of said cameras and projector, so that the displayed image comprises an area of darkness that at least encompasses the subject's eyes and that does not extend appreciably beyond the subject's head.

According to yet another aspect there is provided a projection system comprising:

a projector receiving image data and projecting an image onto a background;

at least one camera capturing an image of the background including the projected image, said at least one camera being spaced from said projector and having a viewpoint differing from that of said projector; and processing structure processing the captured image to locate a subject in the captured image and to map the subject to the viewpoint of said projector, said processing structure masking image data used by the projector to project the image corresponding to a region that encompasses at least the subject's eyes.

According to still yet another aspect there is provided in a projection system comprising a projector to project an image for display on a background and at least two spaced cameras to capture images of said background, a method of determining the distance a subject in the captured image is from the background, said method comprising:

comparing the images captured by the cameras to determine image disparity; and using the image disparity and the geometry of the projection system to calculate the background to subject distance.

In one embodiment, during the comparing subsets of the captured images are compared. During comparing a subset of one image is selected and scanned across the other image to locate a matching subset in the other image.

According to still yet another aspect there is provided in a projection system comprising a projector to project an image for display on a background and at least one camera to capture an image of said background, a method of setting up said projection system comprising:

determining the orthogonal distance between the background and the projector and determining the width of said background;

assuming a maximum distance that a subject will stand in front of said background;

using the orthogonal distance, the width and the maximum distance to calculate a maximum camera to projector spacing; and positioning said at least one camera relative to and within said maximum camera to projector spacing of said projector.

The method and apparatus provide advantages in that captured images are analyzed to detect the existence of a subject so that the image projected onto the background is modified to inhibit projected light from being directed at the subject's eyes. Thus, neither visible light nor non-visible light is directed at the subject's eyes when the subject is positioned in front of the background on which the projected image is displayed.

BRIEF DESCRIPTION OF THE DRAWINGS

Embodiments will now be described more fully with reference to the accompanying drawings in which.

DETAILED DESCRIPTION OF THE EMBODIMENTS

Figure 1:
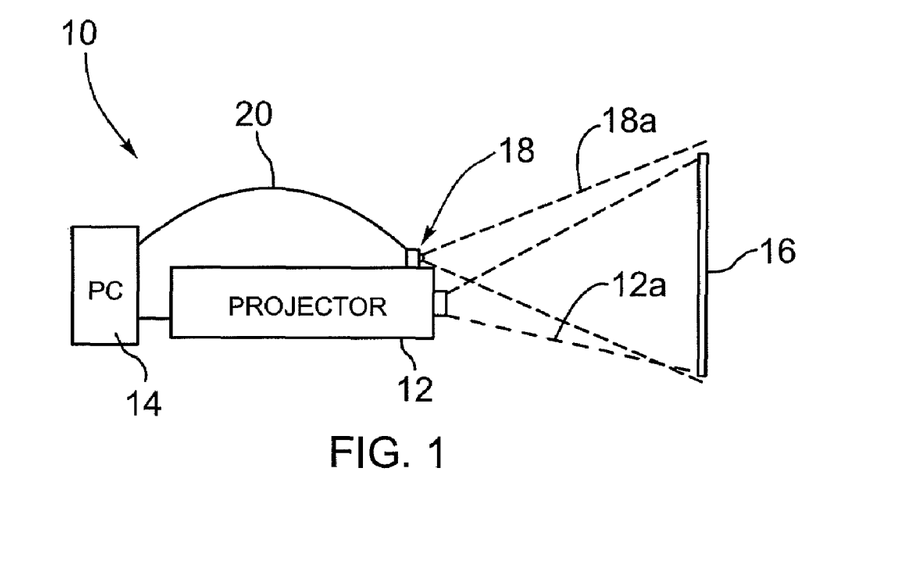
FIG. 1 is a schematic side view of a projection system including an apparatus for inhibiting a subject's eyes from being exposed to projected light.
Figure 2:
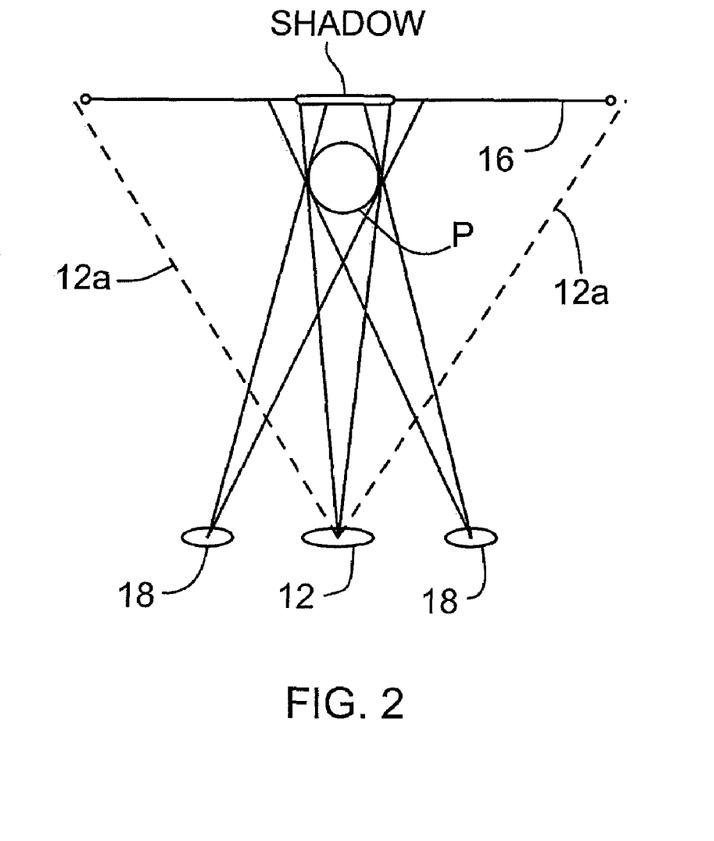
FIG. 2 is a top plan view of the projection system of FIG. 1 illustrating a pair of low resolution cameras and a projector positioned therebetween.
Figure 3:
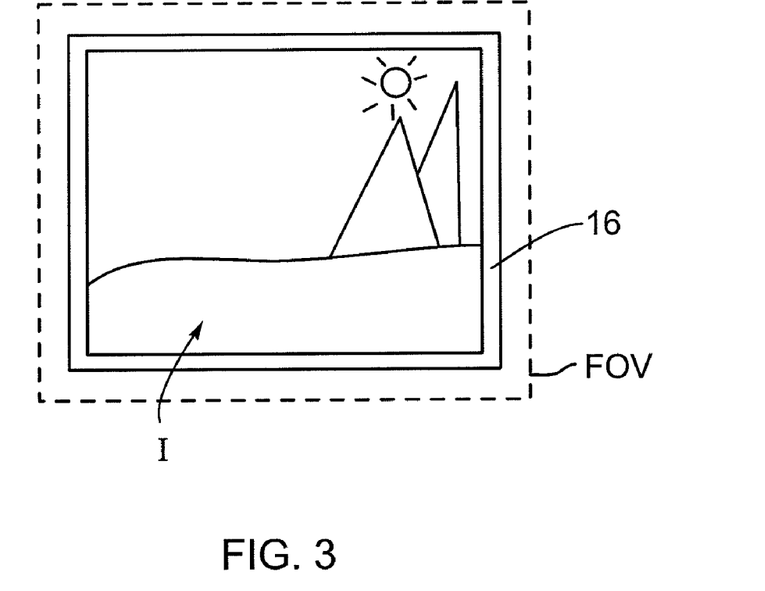
FIG. 3 is a front view of a projection screen on which a projected image is displayed.

Turning now to FIGS. 1 to 3, a projection system is shown and is generally identified by reference numeral 10. In this embodiment, projection system 10 is similar to that disclosed in above-incorporated U.S. patent application Ser. No. 11/420,146 to Morrison et al. As can be seen, projection system 10 includes a projector 12 receiving an input video data stream from a processing device such as for example, a personal computer (PC) 14. Projector 12 in response to the input video data stream projects an image I onto a projection screen 16 as shown in FIG. 3 and by the dotted lines 12a in FIGS. 1 and 2. Projection screen 16 in this embodiment is an interactive touch board or panel of the type manufactured by SMART Technologies, Inc. of Calgary, Alberta, Canada and sold under model No. SB 680.

A pair of low resolution video cameras 18 is positioned adjacent the projector 12. The cameras 18 are horizontally spaced, with each camera being fixed in position on either side of the projector 12. Each camera 18 has a field of view (FOV) encompassing the projection screen 16 as shown in FIG. 3 and by the dotted lines 18a in FIG. 1. In this manner, the cameras 18 capture images including the entire projection screen 16 and the image I displayed thereon as well as any objects, such as a presenter P, positioned in front of the projection screen 16. The cameras 18 are coupled to the personal computer 14 via universal serial bus (USB) connections 20.

To avoid a presenter P from being blinded by light projected by the projector 12 when the presenter is positioned in front of the projection screen 16, the projection system 10 makes use of image analysis to mask the input video data stream provided to the projector 12 so that pixels corresponding to a region generally encompassing the presenter's head are set to black or near black (i.e. dimmed). In this manner, the presenter P is able to stand in front of the projection screen 16 and look back at the projector 12 without being blinded by projected light.

Figure 9:
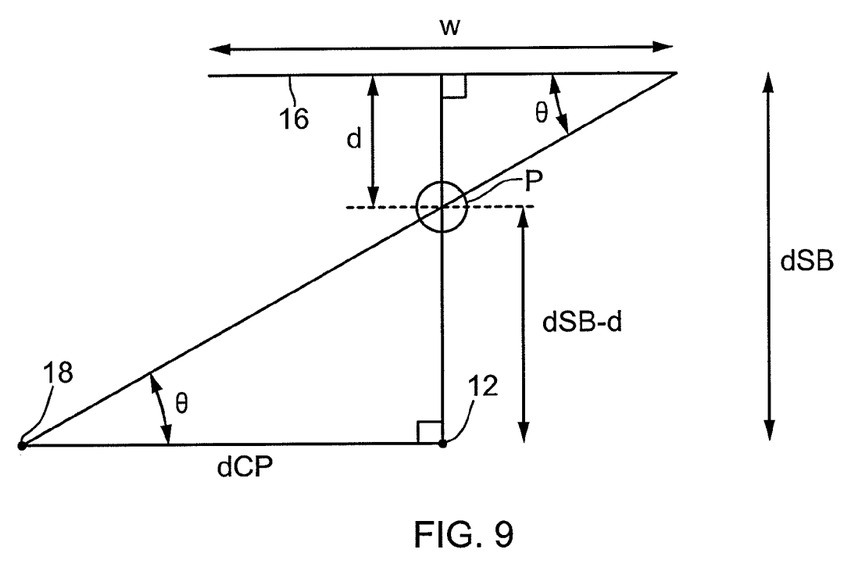
FIG. 9 shows the horizontal geometry of the projection system of FIG. 1 with respect to the left low resolution camera.

During set up of the projection system 10, it is desired to determine the maximum spacing between the projector 12 and the cameras 18 so that the projection system 10 can be installed in a manner that ensures desired operation. Referring now to FIG. 9, the horizontal geometry of the projection system 10 is shown assuming that the optical axis of the projector 12 is orthogonal to the plane of the projection screen 16. As can be seen, the width of the projection screen 16 is designated by reference character W. The horizontal distance between the left camera 18 and the projector 12 is designated by reference character dCP. The distance between the projection screen 16 and the left camera 18 is designated by reference character dSB. The distance between the projection screen 16 and the presenter P is designated by reference character d. The distance between the presenter P and the projector 12 can therefore be expressed as dSB-d. As will be appreciated by those of skill in the art, although not illustrated the vertical geometry of the projection system 10 is very similar to that shown in FIG. 9 with two exceptions. When examining the vertical geometry of the projection system 10, the projection screen width W is replaced with the projection screen height H and the horizontal camera to projector spacing dCP is replaced with the vertical camera to projector spacing dCP.

Based on the above, the extreme viewing angle θ of the left camera 18 at which the entire planar surface of the projection screen 16 as well as a presenter P in front of the projection screen can still be seen, can be expressed as:

$$\tan(\theta) = d/(W/2) = \frac{d_{SB} - d}{d_{CP}} \quad (1)$$

Equation (1) can be rewritten as:

$$d_{CP} = \frac{W\left(\frac{d_{SB}}{d} - 1\right)}{2} \quad (2)$$

From Equation (2), it can be seen that the maximum camera to projector spacing dCP increases linearly with the distance between the camera 18 and the projection screen 16. The maximum camera to projector spacing dCP however decreases as the distance d between the presenter P and the projection screen 16 increases. Using the minimum and maximum projection screen to camera distances dSB and the minimum and maximum projection screen to presenter distances d, from Equation (2), the maximum camera to projector spacing can be calculated for different projection system configurations allowing the cameras 18 and projector 12 to be quickly and effectively oriented while ensuring that the presenter P in front of the projection screen 16 remains within the fields of view of the cameras 18 so that the position of the presenter P can be properly tracked.

Figure 10A:
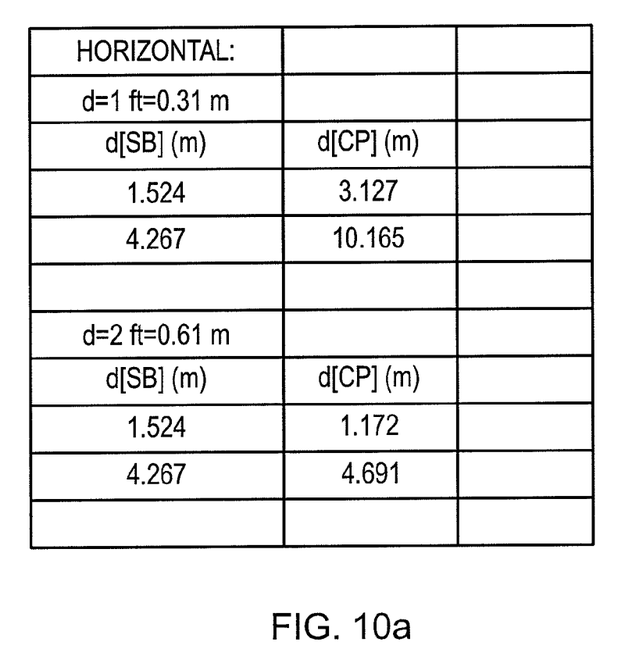
FIGS. 10a to 10c are tables showing the maximum horizontal camera to projector spacing for different projection system configurations.
Figure 10B:
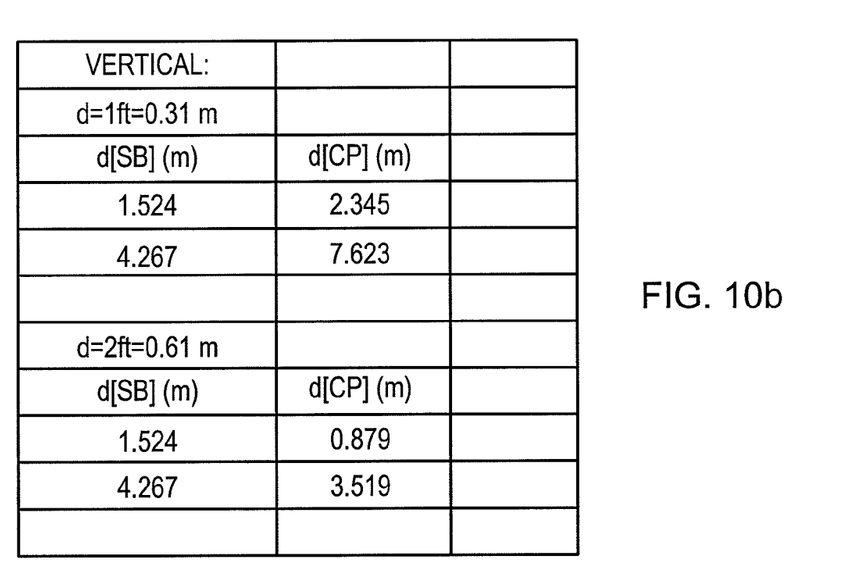

For example, assume that the projection screen 16 has a diagonal length equal to 1.1956 m (77 inches) and an aspect ratio of 4:3 and that the minimum and maximum projection screen to camera distances dSB are 1.524 m (5 feet) and 4.267 m (14 feet) respectively. Also assume that the presenter P will typically stand at distances d in front of the projection screen 16 in the range of from about 0.31 m to 0.61 m (1 to 2 feet). Based on the above assumptions and solving for Equation (2), FIG. 10a is a table showing the maximum horizontal camera to projector spacing dCP assuming the projection screen to presenter distance d is equal to 0.31 m at each of the minimum and maximum projection screen to camera distances dSB as well as the maximum camera to projector spacing dCP assuming the projection screen to presenter distance d is equal to 0.61 m at each of the minimum and maximum projection screen to camera distances dSB. FIG. 10b is a table showing the maximum vertical camera to projector spacing dCP assuming the projection screen to presenter distance d is equal to 0.31 m at each of the minimum and maximum projection screen to camera distances dSB as well as the maximum camera to projector spacing dCP assuming the projection screen to presenter distance d is equal to 0.61 m at each of the minimum and maximum projection screen to camera distances dSB. As will be appreciated from the above, at a minimum projection screen to camera distance dSB equal to 5 feet, the maximum camera to projector spacing dCP is about 3 to 4 feet.

Figure 10C:
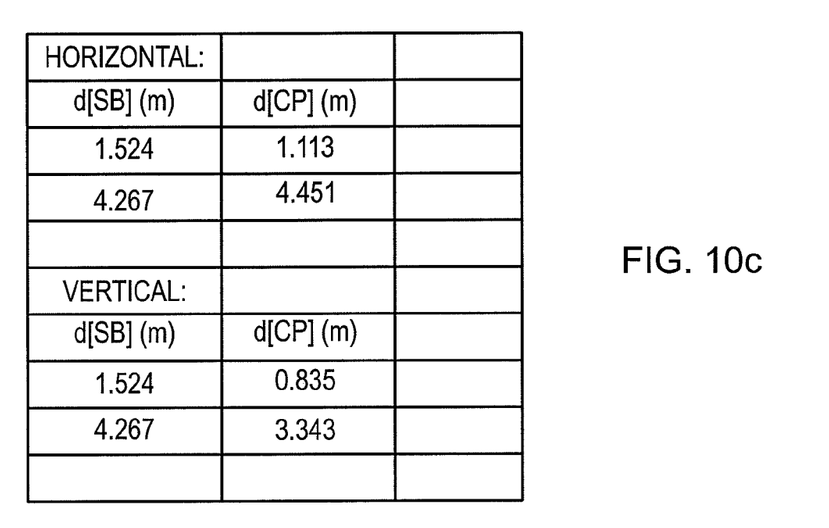

FIG. 10c is a table showing the maximum horizontal and vertical camera to projector spacing dCP assuming the projection screen to presenter distance d is equal to 0.61 m and that the width and height of the projection screen 16 have been decreased by 5% at each of the minimum and maximum projection screen to camera distances dSB. In this case, the width of the projection screen 16 is equal to 1.1485 m and the height of the projection screen 16 is equal to 1.115 m. As can be seen, as the size of the projection screen 16 decreases, the camera to projector spacing dCP decreases.

Prior to general use of the projection system 10 once the cameras 18 and projector 12 have been properly oriented with respect to the projection screen 16, the projection system 10 is calibrated in the manner described in above-incorporated U.S. patent application Ser. No. 11/420,146 to Morrison et al. Accordingly, specifics of the calibration will not be discussed further herein. Calibration of the projection system 10 matches the views of the cameras 18 through an image transformation with respect to the surface of the projection screen 16 such that image superposition creates one image of the viewed scene. Foreground objects such as the presenter P are separated from the plane of the projection screen 16 due to the effect of planar parallax and show up as two images of finite separation related to the stereo camera positions. The calibration is fully automated without requiring intervention from the presenter or requiring projecting of special images that are visible during calibration.

Once calibrated, in use the personal computer 14 outputs a video data stream that is received by the projector 12. In response to the input video data stream, the projector 12 in turn projects an image I onto the projection screen 16. The cameras 18, which see the projection screen 16, the displayed image I and the presenter P, if the presenter exists in their fields of view, capture images and convey the captured images to the personal computer 14 over the USB connections 20. Thus, the computer 14 receives pairs of images from the cameras 18.

Figure 4:
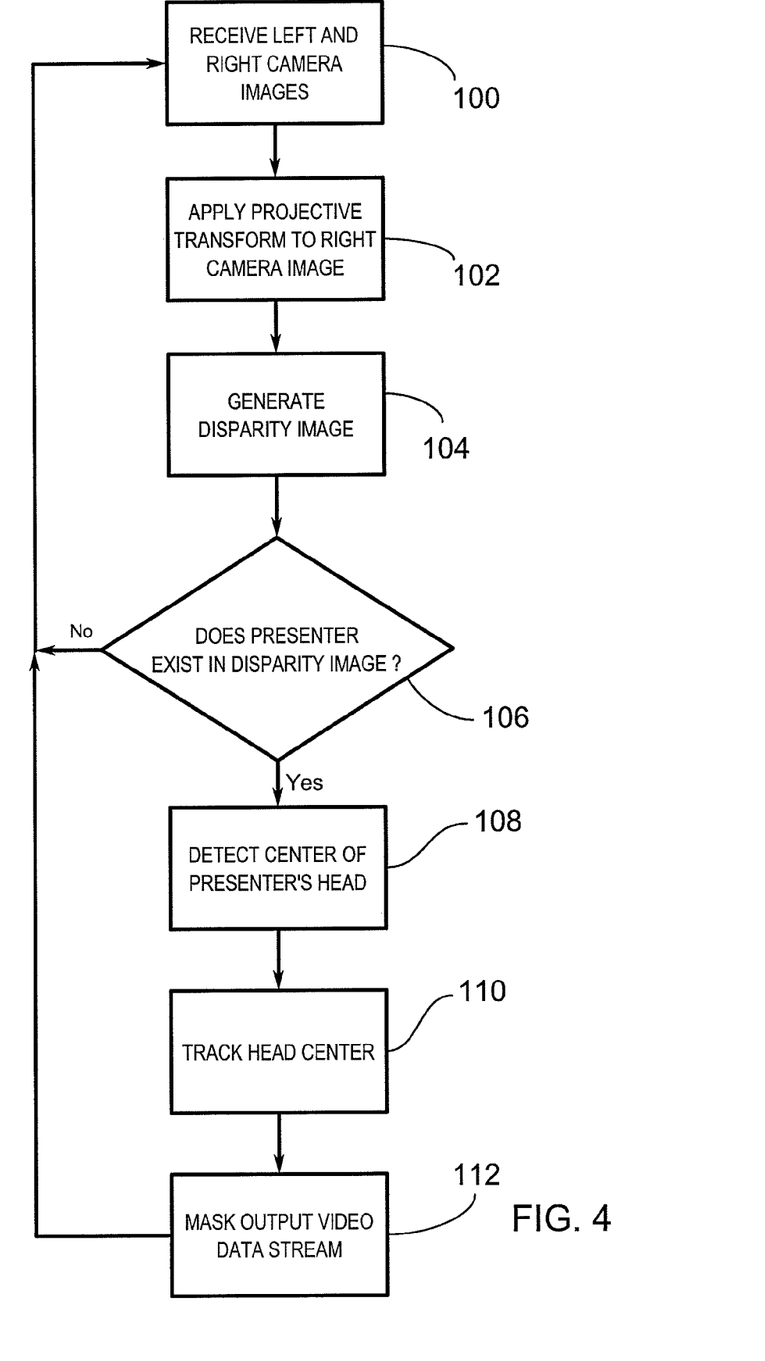
FIG. 4 is a flowchart showing the steps performed during processing of captured images to detect the presence of a presenter and to mask an output video data stream.

Upon receipt of each pair of images from the cameras 18, the computer 14 processes the images to detect whether a presenter is positioned in front of the projection screen 16 and if so, to determine the location of the presenter's head so that the video data stream input to the projector 12 can be masked to inhibit the presenter from being blinded by projected light. In particular as shown in FIG. 4, when the computer 14 receives the images from the cameras 18 (step 100), the computer 14 applies a homography transformation matrix calculated during calibration to the right camera image to transform the right camera image to the coordinate system of the left camera image (step 102). With the right and left camera images in the same coordinate system, a statistical cross-correlation between the images is performed to generate a disparity image (step 104). The disparity image is then examined to determine if a presenter exists in the disparity image (step 106). If the existence of a presenter is not detected, the camera images are discarded and the process reverts back to step 100 to await receipt of the next pair of camera images.

Figure 5:
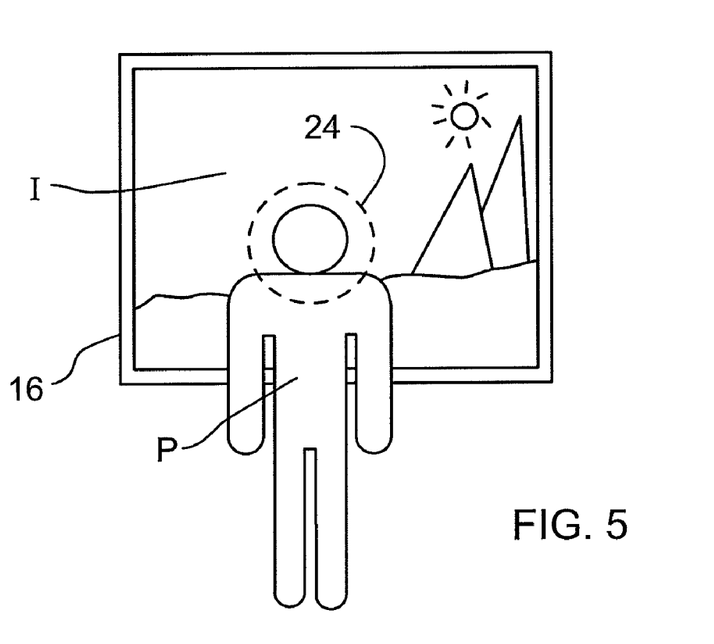
FIG. 5 is a front view showing a presenter positioned in front of the projection screen.

If the existence of a presenter is detected at step 106, the disparity image is further processed to detect the center of the presenter's head (step 108). With the center of the presenter's head detected, the presenter's head is tracked (step 110) and the average center position and velocity of the presenter's head over successive image pairs is used to mask the video data stream so that pixels corresponding to a circular region encompassing the presenter's head are set to black or near black (step 112). As a result, when the video data stream is output to the projector 12, projected light is inhibited from being directed at the presenter's eyes as a circular area of darkness 24 encompasses the presenter's head as shown in FIG. 5. As the cameras 18 continually capture images of the projection screen 16 and displayed image I, movement of the presenter P is tracked allowing the area of darkness 24 to be moved to follow the presenter.

Figure 6:
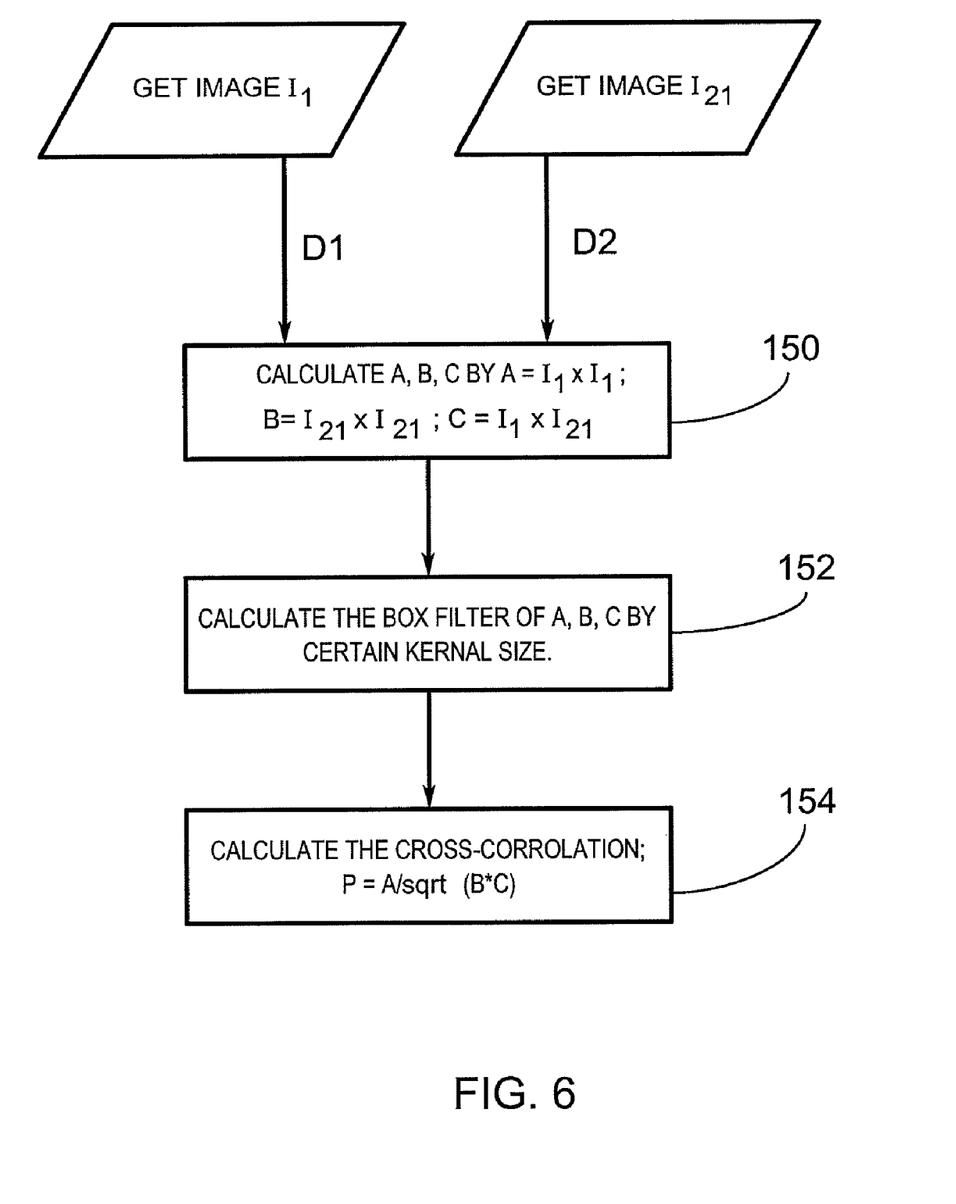
FIG. 6 is a flowchart showing the steps performed during processing of captured images to generate a disparity image.

At step 104, during generation of the disparity image, images A, B and C are initially calculated (see step 150 in FIG. 6) according to:

$$A = I_{LC} \times I_{LC}$$

$$B = I_{TRC} \times I_{TRC}$$

$$C = I_{LC} \times I_{TRC}$$

where:

$I_{LC}$ is the image captured by the left camera; and
$I_{TRC}$ is the transformed image captured by the right camera.

A box filter of the appropriate kernel size is then applied to each image A, B and C (step 152). The statistical cross-correlation is then calculated to generate the disparity image P (step 154) according to:

$$P = A/\sqrt{B \times C}$$

The equation used to generate the disparity image is subject to a divide by zero (or close to zero) exception during tracking of dark objects in the captured images. Hardware and/or software interrupts are therefore employed to replace such divide by zero exceptions with numbers that are in a range that will yield a reasonable result. Overexposing the cameras 18 such that dark objects do not appear as absolute black and have some minimal level of illumination can also be performed to avoid the divide by zero exceptions.

Alternatively, the disparity image may be found by filtering a difference image based on the captured left and transformed right captured images or by generating a Gaussian weighted difference image based on the captured left and transformed right captured images. As will be appreciated, in these instances, the complexity of calculating a square root and performing a divide operation are avoided.

Figure 7A:
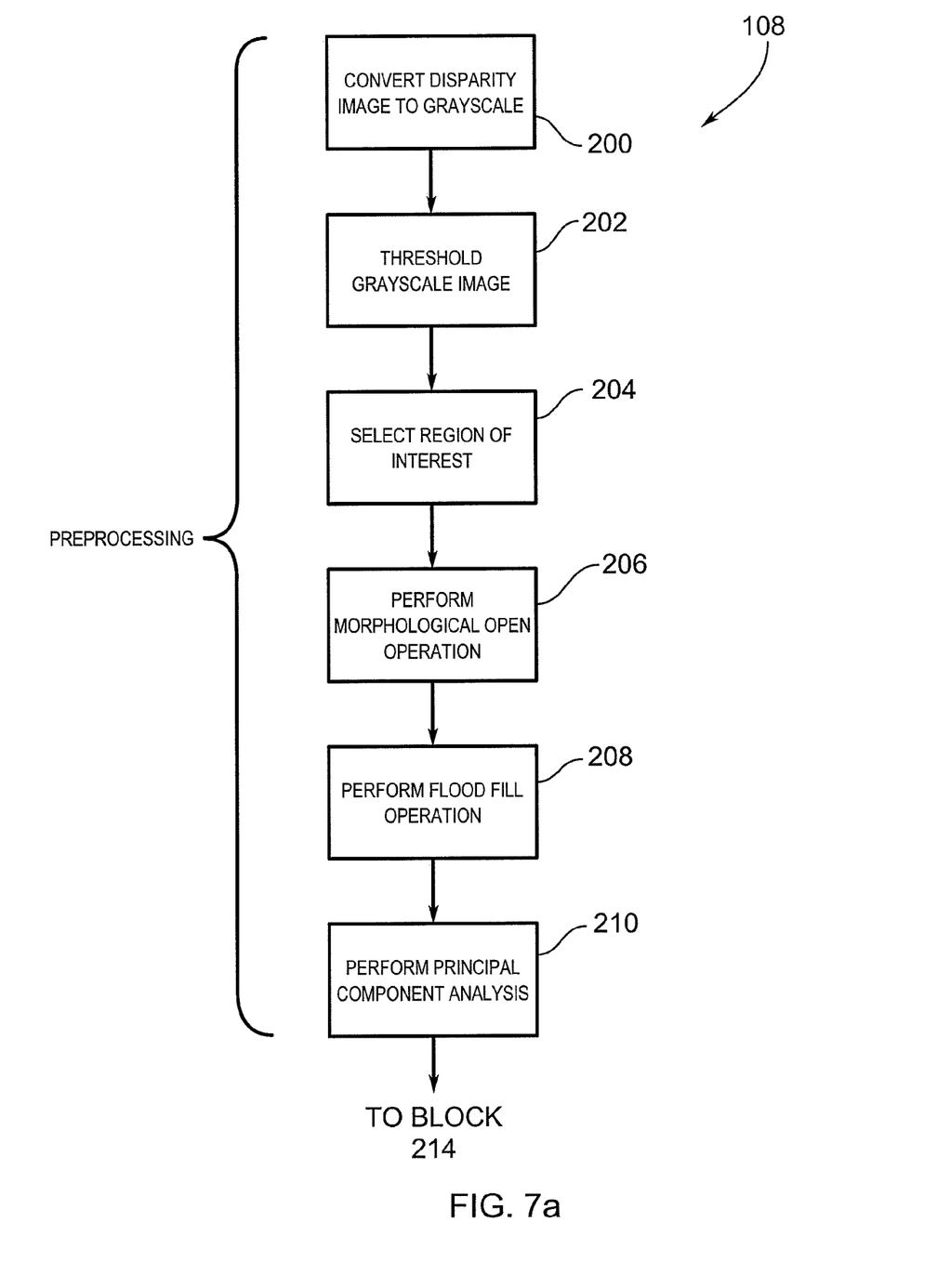
FIGS. 7a and 7b are flowcharts showing the steps performed during processing of captured images to detect the center of the presenter's head.

During step 108, in order to detect the location of the presenter's head, the disparity image is initially preprocessed. During preprocessing as shown in FIG. 7a, the disparity image is firstly converted to greyscale so that the pixel values are in the range of 0 to 255 (step 200). The greyscale image is then thresholded (step 202). During thresholding, pixels having values above 245 and below 220 are set to black and pixels having values in the range of 220 to 245 representing a disparity (i.e. an object in front of the projection screen 16) are set to white. A region of interest (ROI) within the thresholded image that encompasses the majority of the white pixels is then selected (step 204). A morphological open operation is then performed on the thresholded image to remove noise (step 208) and a flood fill operation is performed (step 208) to remove white pixel clusters that are smaller than a threshold size, in this example smaller than 2% of the projection screen area in the captured images. In this manner, the remaining white pixel clusters representing the presenter are isolated. The center (x,y) of the presenter is calculated based on the white pixel clusters in the region of interest (ROI). A principle component analysis is then performed on the white pixel clusters in the ROI (step 210) to detect the major axis of the presenter, the minor axis of the presenter and the orientation of the major axis with respect to the vertical.

Figure 7B:
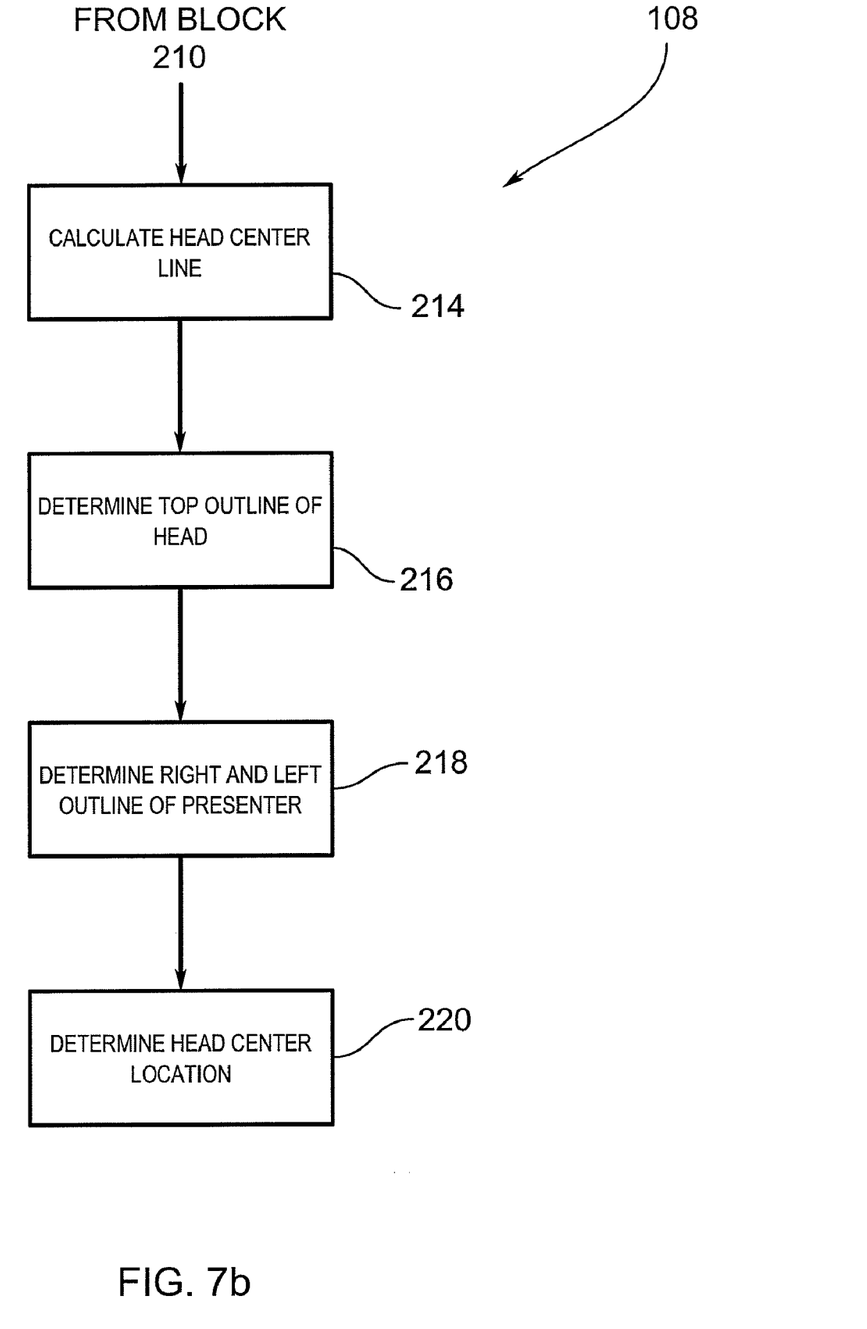

With the disparity image preprocessing completed, the principle component analysis results are used to calculate the centerline of the presenter's head and top of the presenter along the center line (step 214 in FIG. 7b). The top outline of the presenter's head is then calculated and possible head positions are determined (step 216). Following this, the right and left side outlines of the presenter are calculated and the actual head position is determined (step 218). With the head position determined, the center of the presenter's head is calculated (step 220). During processing of the outlines, to enhance detection of the presenter's head, one or two mathematical profiles referred to as rotational profiles may be fitted to the outline to locate the presenter's head.

Figure 8:
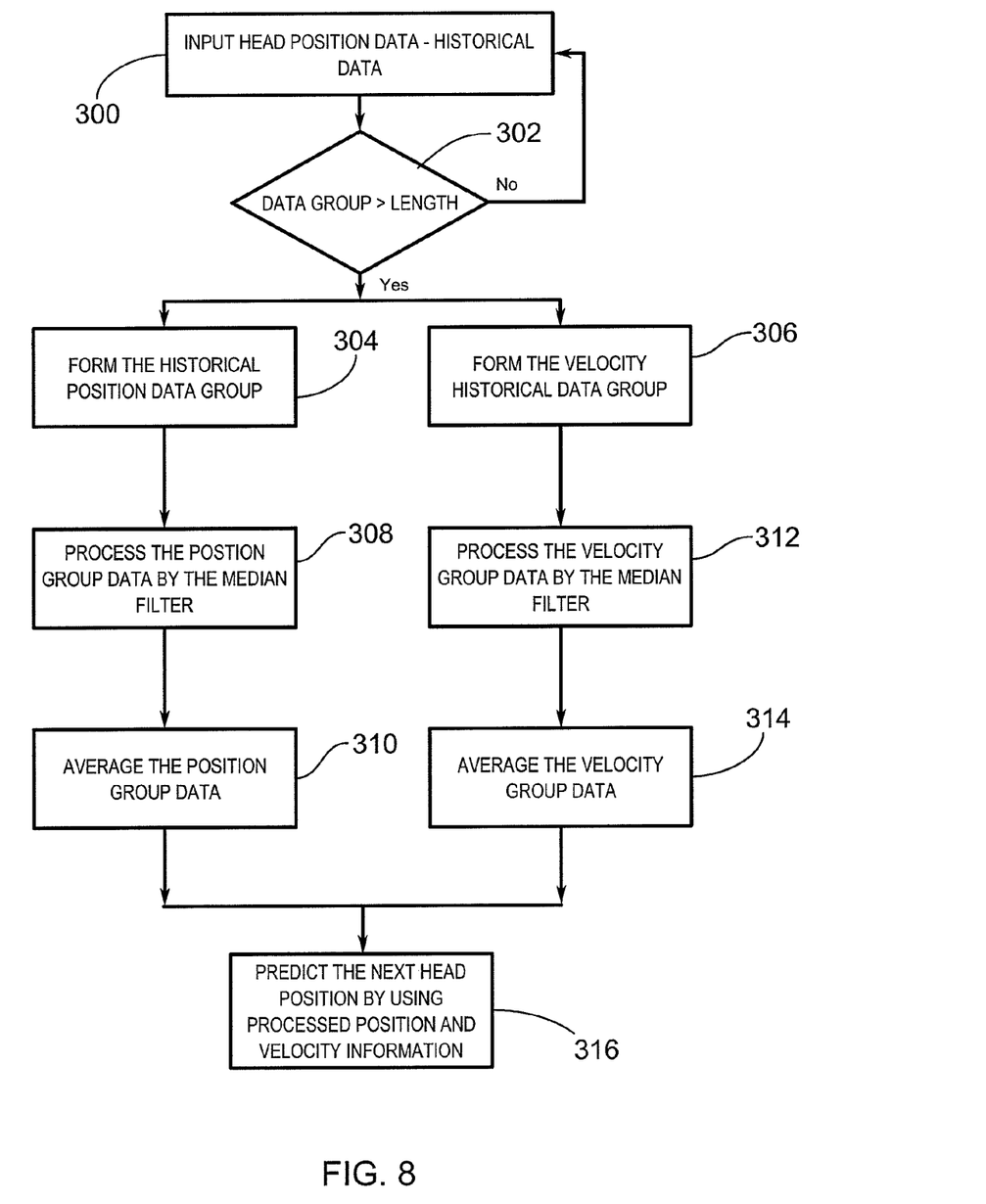
FIG. 8 is a flowchart showing the steps performed during processing of captured images to track the center of the presenter's head.

At step 110, during tracking, after the center position of the presenter's head has been calculated at step 220, the center position is stored in memory (step 300 in FIG. 8). A check is then made to determine if a threshold number of center positions are stored in the memory (step 302). If not, the process reverts back to step 300 awaiting the next calculated head center position. If a threshold number of center positions exist, a historical center position data group and a historical velocity data group are formed (steps 304 and 306). A median filter is then applied to the historical center position data group (step 308) and an average center position ($X_{ay}$, $Y_{ax}$) is calculated (step 310) A median filter is also applied to the historical velocity data group (step 312) and an average velocity ($V_{ax}$, $V_{ay}$) is calculated (step 314). The average center position and average velocity is then used to predict a position ($P_x$, $P_y$) representing the center of the presenter's head (step 316) according to:

$$P_x = X_{ay} + V_{ax}\Delta t$$

$$P_y = Y_{ax} + V_{ay}\Delta t$$

This center position ($P_x$, $P_y$) is used to calculate a circular mask encompassing the presenter's head (step 312). The pixels of the video data stream falling within the circular mask are then dimmed as described above so that when the video data stream is input to the projector 12 and a resultant image is projected on the projection screen 16, the area of darkness 24 encompasses the presenter's head inhibiting the presenter from being blinded by projected light.

As will be appreciated, the projection system 10 tracks a presenter p moving in front of the projection screen 16 and masks the video data stream input to the projector 12 to inhibit the presenter from being blinded.

Figure 11:
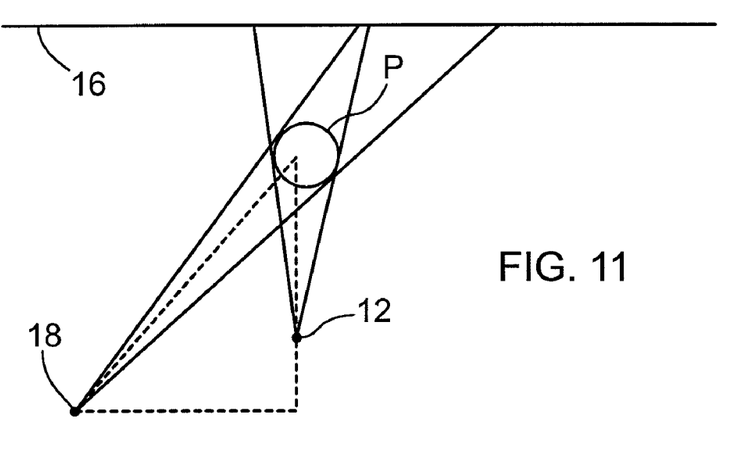
FIG. 11 shows the horizontal geometry with respect to the left low resolution camera for a different projection system configuration.
Figure 12:
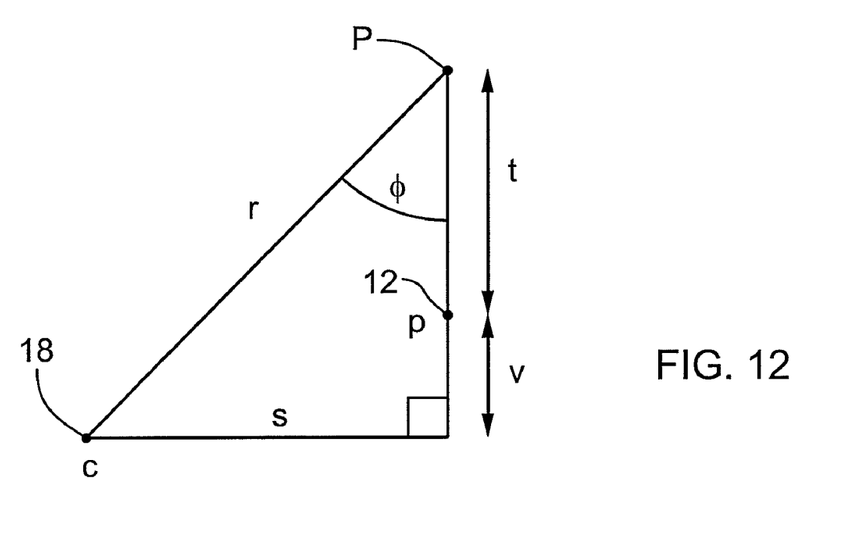
FIG. 12 shows a portion of the horizontal geometry of FIG. 11.

Depending on the projection system setup, the cameras 18 may or may not be located close to the projector 12. If the cameras 18 are not close to the projector 12, the viewpoints of the cameras 18 as compared to the projector 12 may be significantly different. In order to ensure that the masked region of the video data stream accurately tracks the presenter's head and does not extend appreciably beyond the intended region to be darkened, a correction to compensate for this difference in viewpoints is desired. For example, FIGS. 11 and 12 show an alternative projection system geometry in the horizontal direction. In this geometry, the left camera 18 is spaced further from the projection screen 16 than the projector 12. From FIG. 12, it can be seen that the following relationship exists:

$$r^2 = s^2 + (t+v)^2 \quad (3)$$

Solving Equation (3) for the projection screen to projector distance yields:

$$v = t \pm \sqrt{r^2 - s^2}$$

The angle ø of the left camera's field of view can be expressed as:

$$\tan(\theta) = \frac{s}{\sqrt{r^2 - s^2}}$$

The offsets s and t of the camera 12 with respect to the projector 12 can be measured. The camera to projection screen distance dSB is known from the projection system set up. Because the cameras 18 are located at a distance from the projector 12, the projected size of the presenter's head is different from the viewpoints of the cameras 18 and projector 12. Simply projecting the presenter's head as seen by the cameras 18 onto the reference frame of the projector 12 may result in inaccuracies. Let w' denote the projected size of the presenter's head at the cameras 18 and w' denote the projected size of the presenter's head at the projector 12. The projected size of the presenter's head at the cameras 18 is expressed by the perspective projection as:

$$w = \frac{fW}{d}$$

where:
f is the focal length of the left camera 18; and
W is the diameter of the presenter's head.

A similar expression exists for the projector. The projected size w' of the presenter's head at the projector 12 is related to the projected size w of the presenter's head at the camera 18 by:

$$w' = w \cos(\phi)$$

The angle ø is computed on the basis of the measured offsets s and t. With the angle ø computed, the projected size of the presenter's head as seen by the cameras 18 can be converted into a corresponding projected size as seen by the projector 12. In other words, the projected size of the presenter's head is converted to a size as would be seen by the cameras if the cameras were positioned at the projector 12. The converted projected size of the presenter's head as seen by the projector 12 is then scaled to take into account the different resolutions of the cameras 18 and projector 12. The position of the presenter's head can then be accurately mapped from the reference frame of the left camera 18 to the reference frame of the projector 12 by computing the homography relating the camera and projector focal planes assuming that the keystone correction of the projector 12 orients the optical axis of the projector such that it is orthogonal to the plane of the projection screen 16. In this manner, the size of the circular mask that is used to dim pixels of the video data stream can be properly selected so that the area of darkness encompasses at least the presenter's eyes but does not extend appreciably beyond the presenter's head irrespective of the orientation of the cameras 18 with respect to the projector 12.

Figure 13:
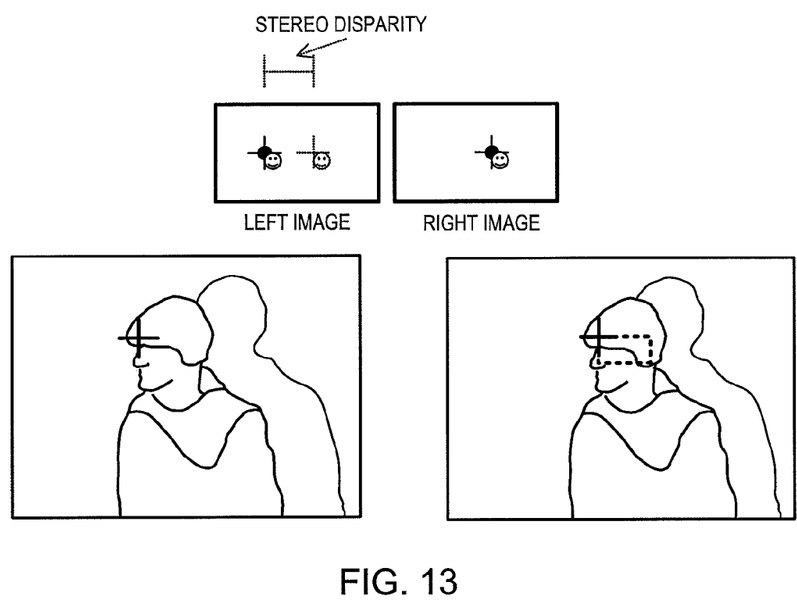
FIG. 13 shows template matching between right and left captured images to calculate stereo disparity.
Figure 14:
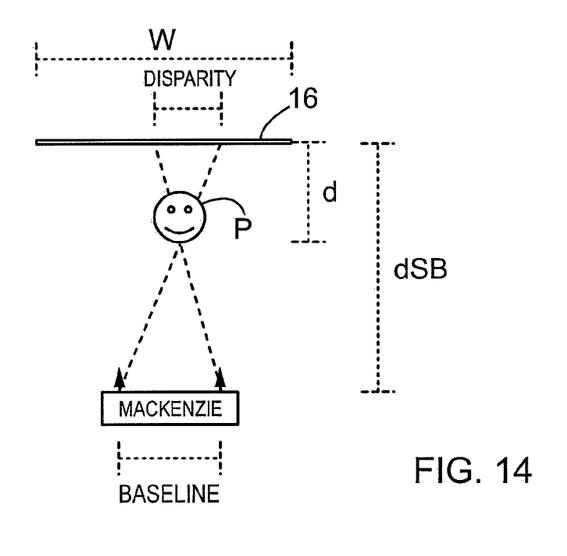
FIG. 14 shows the stereo disparity geometry.

If desired, the distance d of the presenter P from the projection screen 16 can be determined from the captured right and left camera images. In order to calculate the projection screen to presenter distance d, the computer 14 selects a rectangular sample region or search template, in this embodiment a 24×12 pixel region, from the right camera image that is positioned on the presenter's face. The search template is then scanned horizontally across the left camera image until a matching region in the left camera image is determined. During comparing of the search template to pixel regions of the left camera image, matching of horizontal edges is emphasized. Once the matching region in the left camera image is determined, the difference between the coordinates of the search template in the right camera image and the matching region in the left camera image is calculated. With the coordinate differences known, based on the stereo disparity geometry shown in FIG. 14, the disparity can be calculated according to:

$$\text{Disparity(cm)} = \text{Disparity(pixels)} \frac{\text{image width (pixels)}}{W \text{ (cm)}}$$

With the disparity calculated, the projection screen to presenter distance or depth d can be calculated according to:

$$\text{Depth (cm)} = \frac{\text{Disparity(cm) } dSB \text{ (cm)}}{\text{Basline(cm)} + \text{Disparity(cm)}}$$

where:
Baseline is the distance between the focal points of the cameras 18. Knowing the distance or depth d of the presenter P from the projection screen 16 allows the size of the video data stream mask to be accurately determined.

Although the above embodiment describes the cameras 18 as being fixed in position on opposite sides of the projector 12, if desired, the cameras 18 can be mounted on rails or tracks and moveable manually or by drive mechanisms along the tracks to allow the camera to projector spacings to be adjusted. In this latter case, calculation of the projection screen to presenter distance d can be used as feedback for the drive mechanisms so that the drive mechanisms can be operated to adjust the camera to projector spacing dCP as the presenter P moves towards and away from the projection screen 16. In this manner, the cameras 18 can be positioned to ensure presenter P remains in the fields of view of the cameras.

Although embodiments have been described with particular reference to the drawings, those of skill in the art will appreciate that variations and modifications may be made without departing from the spirit and scope thereof as defined by the appended claims.

What is claimed is:

1. In a projection system comprising a projector to project an image for display on a background and at least two cameras to capture images of said background from different vantages, each of said at least two cameras having a viewpoint differing from the viewpoint of said projector, a method of inhibiting a subject's eyes from being exposed to projected light when the subject is positioned in front of the background, said method comprising:

capturing sets of images of the background including the displayed image;

processing the captured images to detect the existence of a subject therein and to locate generally the depth of the subject from said background; and     masking image data used by the projector to project the image corresponding to a region that encompasses at least the subject's eyes, said image data masking compensating for said differing camera and projector viewpoints.

2. The method of claim 1 wherein during said masking, pixels in said region are set to a black or near black level.

3. The method of claim 1 wherein said region is geometrically shaped and generally encompasses the subject's head.

4. The method of claim 3 wherein said projection system comprises at least two spaced cameras, during said capturing, multiple images being captured and during said processing, a disparity image based on the captured images being generated.

5. The method of claim 4 wherein during said capturing, sets of images are successively captured and mapped to one another, each set of mapped images being processed to yield the disparity image.

6. The method of claim 5 wherein during said processing, said disparity image is processed to detect generally the center of the subject's head, the geometrically shaped region being generally centered about the center of the subject's head.

7. The method of claim 6 wherein during processing, said disparity image is examined to determine if a subject exists therein, if so, said disparity image is thresholded prior to processing to detect generally the center of the subject's head.

8. The method of claim 7 further comprising tracking the subject's head over successive sets of images and calculating an average center position, said average center position being used to position said geometrically shaped region.

9. The method of claim 8 further comprising calculating an average head velocity and using said average level velocity and average head position to position said geometrically shaped region.

10. The method of claim 1 wherein during said processing, the subject as seen by said at least one camera, is converted generally to a size as would be seen by said camera if positioned at said projector.

11. The method of claim 10 wherein the subject as seen by said at least one camera is scaled to compensate for different camera and projector resolutions.

12. The method of claim 1 wherein said background is an interactive touch panel.

13. In a projection system comprising a projector to project an image for display on a background and at least two laterally spaced cameras to capture an image of said background, a method of inhibiting a subject's eyes from being exposed to projected light when the subject is positioned in front of the background, said method comprising:

successively capturing sets of images of the background including the displayed image from different vantages;

processing each set of captured images to detect the existence of the subject and to locate generally the depth of the subject's head from the background; and     modifying image data used by the projector to project the image taking into account differing viewpoints of said cameras and projector, so that the displayed image comprises an area of darkness that at least encompasses the subject's eyes and that does not extend appreciably beyond the subject's head.

14. The method of claim 13 wherein the images of each set are mapped to one another, the mapped images being processed to yield a disparity image.

15. The method of claim 14 wherein during processing, said disparity image is examined to determine if a subject exists therein, if so, said disparity image is thresholded prior to processing to detect generally the center of the subject's head.

16. The method of claim 15 further comprising tracking the subject's head over successive sets of images and calculating an average center position, said average center position being used to position said geometrically shaped region.

17. A projection system comprising:

a projector receiving image data and projecting an image onto a background;

at least two cameras capturing images of the background including the projected image from different vantages, each of said at least two cameras being spaced from said projector and having a viewpoint differing from that of said projector; and     processing structure processing the captured images to locate a subject in the captured images and to map the depths of the subject to the viewpoint of said projector, said processing structure masking image data used by the projector to project the image corresponding to a region that encompasses at least the subject's eyes.

18. A projection system according to claim 17 further comprising a video source providing the image data to said projector.

19. A projection system according to claim 18 wherein said video source is a computer.

20. A projection system according to claim 19 wherein said computer is coupled to said at least one camera and masks the image data.

21. A projection system according to claim 20 wherein said computer processes the captured images to detect when the subject occludes projected light and to locate generally the subject's head.

22. A projection system according to claim 21 wherein during masking, said processing structure sets pixels in the region to a black or near black level.

23. A projection system according to claim 22 wherein said region is geometrically shaped and generally encompasses the subject's head.

24. In a projection system comprising a projector to project an image for display on a background and at least two spaced cameras to capture images of said background from different vantages, a method of determining the distance a subject in the captured image is from the background, said method comprising:

comparing the images captured by the cameras to determine image disparity;

using the image disparity and the geometry of the projection system to calculate the background to subject distance; and     masking at least a portion of the subject.

25. The method of claim 24 wherein during said comparing, subsets of the captured images are compared.

26. The method of claim 25 wherein during said comparing a subset of one image is selected and scanned across the other image to locate a matching subset in said other image.

27. The method of claim 26 wherein the subset of said one image is horizontally scanned across the other image.

28. In a projection system comprising a projector to project an image for display on a background, an image processor and at least two cameras to capture images of said background from different vantages, a method of setting up said projection system comprising:
- determining the orthogonal distance between the background and the projector and determining the width of said background;
- assuming a maximum distance that a subject will stand in front of said background;
- using the orthogonal distance, the width and the maximum distance to calculate a maximum camera to projector spacing;
- positioning said at least two cameras relative to and within said maximum camera to projector spacing of said projector; and
- during image projection, masking at least a portion of the subject.

* * * * *